(12) United States Patent
Lee et al.

(10) Patent No.: US 10,436,893 B2
(45) Date of Patent: Oct. 8, 2019

(54) APPARATUS AND METHOD FOR EXTRACTING OCEAN WAVE INFORMATION

(71) Applicants: ELECTRONICS AND TELECOMMUNICATIONS RESEARCH INSTITUTE, Daejeon (KR); HANBAT NATIONAL UNIVERSITY INDUSTRY-ACADEMIC COOPERATION FOUNDATION, Daejeon (KR)

(72) Inventors: Byung-Gil Lee, Daejeon (KR); Jin-Soo Kim, Daejeon (KR)

(73) Assignees: ELECTRONICS AND TELECOMMUNICATIONS RESEARCH INSTITUTE, Daejeon (KR); HANBAT NATIONAL UNIVERSITY INDUSTRY-ACADEMIC COOPERATION FOUNDATION, Daejeon (KR)

( * ) Notice: Subject to any disclaimer, the term of this patent is extended or adjusted under 35 U.S.C. 154(b) by 296 days.

(21) Appl. No.: 15/436,664

(22) Filed: Feb. 17, 2017

(65) Prior Publication Data
US 2017/0315225 A1 Nov. 2, 2017

(30) Foreign Application Priority Data

Apr. 28, 2016 (KR) .................. 10-2016-0052345
Aug. 29, 2016 (KR) .................. 10-2016-0110199

(51) Int. Cl.
*G01S 13/58* (2006.01)
*G01S 13/42* (2006.01)
(Continued)

(52) U.S. Cl.
CPC ............ *G01S 13/585* (2013.01); *G01S 13/42* (2013.01); *G01S 13/917* (2019.05); *G01S 13/95* (2013.01); *Y02A 90/18* (2018.01)

(58) Field of Classification Search
CPC ........ G01S 13/42; G01S 13/585; G01S 13/89; G01S 13/95; G01S 7/03; G01S 7/068; Y02A 90/18
(Continued)

(56) References Cited

U.S. PATENT DOCUMENTS

2003/0167125 A1* 9/2003 Seemann .................. G01S 7/41
702/2
2010/0315284 A1* 12/2010 Trizna ...................... G01S 7/18
342/123
(Continued)

FOREIGN PATENT DOCUMENTS

| KR | 10-0795497 B1 | 1/2008 |
| KR | 10-2008-0093571 A | 10/2008 |

(Continued)

OTHER PUBLICATIONS

Jorg Seemann et al., Radar Image Sequence Analysis of Inhomogeneous Water Surfaces, Jul. 1999 (Year: 1999).*
(Continued)

*Primary Examiner* — Timothy X Pham

(57) ABSTRACT

Disclosed herein are an apparatus and method for extracting ocean wave information. The apparatus for extracting ocean wave information includes a radar image reception unit for receiving a radar image from a radar antenna, a digital conversion unit for converting the received radar image into a digital format, an analysis preparation unit for setting analysis sections of the radar image and performing temporal accumulation on the analysis sections, a three-dimensional (3D) spectrum-conversion unit for converting accumulated analysis sections into a 3D spectrum in a 3D
(Continued)

frequency domain by performing a temporal/spatial 3D Fast Fourier Transform (FFT) on the accumulated analysis sections, and an ocean wave information extraction unit for extracting ocean wave information based on the 3D spectrum.

14 Claims, 7 Drawing Sheets

(51) Int. Cl.
*G01S 13/95* (2006.01)
*G01S 13/91* (2006.01)

(58) Field of Classification Search
USPC .......................................................... 342/107
See application file for complete search history.

(56) References Cited

U.S. PATENT DOCUMENTS

| | | | |
|---|---|---|---|
| 2014/0152489 A1 | 6/2014 | Lee et al. | |
| 2015/0048971 A1* | 2/2015 | Susaki | G01S 7/24 342/176 |
| 2015/0261869 A1 | 9/2015 | Lee et al. | |

FOREIGN PATENT DOCUMENTS

| | | |
|---|---|---|
| KR | 10-0950301 B1 | 3/2010 |
| KR | 10-2015-0044703 A | 4/2015 |
| WO | 2007142433 A1 | 12/2007 |

OTHER PUBLICATIONS

Jun-Soo Park et al., "Development of a Wave Monitoring System Using a Marine Radar", Journal of Ocean Engineering and Technology, Feb. 2006, pp. 37-42.

I. R. Young et al., "A Three-Dimensional Analysis of Marine Radar Images for the Determination of Ocean Wave Directionality and Surface Currents", Journal of Geophysical Research, Jan. 20, 1985, pp. 1049-1059, vol. 90, No. C1, American Geophysical Union.

Rune Gangeskar, "Ocean Current Estimated From X-Band Radar Sea Surface Images", IEEE Transactions on Geoscience and Remote Sensing, Apr. 2002, pp. 783-792, vol. 40, No. 4, IEEE.

José Carlos Nieto Borge et al., "Estimation of sea state directional spectra by using marine radar imaging of sea surface," Proceedings of ETCE/OMAE2000 Joint Conference, Energy for the New Millenium, Feb. 14-17, 2000, pp. 1-6, ASME, New Orleans, LA.

* cited by examiner

APPARATUS AND METHOD FOR EXTRACTING OCEAN WAVE INFORMATION

CROSS REFERENCE TO RELATED APPLICATIONS

This application claims the benefit of Korean Patent Application Nos. 10-2016-0052345, filed Apr. 28, 2016 and 10-2016-0110199, filed Aug. 29, 2016, which are hereby incorporated by reference in their entirety into this application.

BACKGROUND OF THE INVENTION

1. Technical Field

The present invention relates generally to technology for stably and precisely extracting ocean wave information and, more particularly, to technology for statistically extracting ocean wave information using radar images received from radar fixedly installed on coastlines.

2. Description of the Related Art

As the amount of marine traffic has increased, and various types of accidents have occurred, the importance of a Vessel Traffic Service (VTS) system for safe and efficient movement of vessels in a VTS area has been emphasized.

The term "VTS system" denotes an information exchange system for preventing vessel accidents, for example by monitoring vessel traffic or marine traffic conditions in real time and by providing safety information to sailing vessels. Such a VTS system may prevent accidents from occurring in a VTS area or reduce the frequency of occurrence of accidents by precisely extracting information about ocean waves on the sea and providing notification of the ocean wave information.

In the VTS system, technology for accurately measuring and monitoring ocean waves in real time is very important. Here, the VTS system may directly measure ocean waves using an oceanographic buoy or may measure ocean waves using artificial satellites.

However, conventional technologies for measuring ocean waves are not objective or are incapable of measuring ocean wave information in real time. Further, there is a high risk of losing or damaging conventional devices used to measure ocean waves, and high costs are incurred in order to obtain information about marine status.

In order to solve these problems, ocean wave monitoring systems using radar have been developed. Such an ocean wave monitoring system using radar is an essential technology for VTS systems, and a key point thereof is to search for an optimal algorithm by comparing and analyzing the performance of various ocean wave detection algorithms.

Although various methods have been devised as ocean wave detection algorithms, conventional ocean wave prediction methods are disadvantageous in that precision and reliability are low, thus deteriorating effectiveness. Therefore, the development of technology for precisely and stably extracting ocean wave information is required.

PRIOR ART DOCUMENTS

Patent Documents (Patent Document) Korean Patent No. 10-0795497 (Date of Publication: Jan. 17, 2008, entitled "Wave Measure Method And System Using Radar")

SUMMARY OF THE INVENTION

Accordingly, the present invention has been made keeping in mind the above problems occurring in the prior art, and an object of the present invention is to extract ocean wave information using a simpler method than when using marine radar, by using fixed coastal radar.

Another object of the present invention is to more precisely extract ocean wave information by statistically accumulating and extracting ocean wave information.

A further object of the present invention is to support decision-making when controlling marine traffic by extracting ocean wave information in real time and transmitting the extracted information to a VTS system.

In accordance with an aspect of the present invention to accomplish the above objects, there is provided an apparatus for extracting ocean wave information, including a radar image reception unit for receiving a radar image from a radar antenna, a digital conversion unit for converting the received radar image into a digital format, an analysis preparation unit for setting analysis sections of the radar image and performing temporal accumulation on the analysis sections, a three-dimensional (3D) spectrum-conversion unit for converting accumulated analysis sections into a 3D spectrum in a 3D frequency domain by performing a temporal/spatial 3D Fast Fourier Transform (FFT) on the accumulated analysis sections, and an ocean wave information extraction unit for extracting ocean wave information based on the 3D spectrum.

The ocean wave information extraction unit may calculate an ocean current speed, performs filtering to eliminate noise in a high-frequency band, and extract ocean wave information, which includes at least one of wave direction information and wave height information, using at least one of a spatial spectrum and a wavenumber spectrum at each angular frequency.

The ocean wave information extraction unit may set a first cost function, calculates a first ocean current speed based on the first cost function, define a dispersion relation equation in which harmonic components are considered using the calculated first ocean current speed, set a second cost function using the defined dispersion relation equation, and calculate a second ocean current speed based on the second cost function.

The ocean wave information extraction unit may be configured to, when a difference between the first ocean current speed and the second ocean current speed is less than a threshold value, set the second ocean current speed as the ocean current speed.

The ocean wave information extraction unit may be configured to, when the difference between the first ocean current speed and the second ocean current speed is equal to or greater than the threshold value, redefine the dispersion relation equation.

The ocean wave information extraction unit may statistically extract the ocean wave information based on at least one of the spatial spectrum and the wavenumber spectrum, which are accumulated for a preset period of time.

The ocean wave information extraction unit may extract the wave direction information based on a frequency of occurrence of angular frequencies corresponding to the spatial spectrum.

The ocean wave information extraction unit may calculate a wave height based on the wavenumber spectrum, and extract the wave height information using an average wave height calculated for the preset period of time.

The apparatus may further include an ocean wave information output unit for displaying the extracted ocean wave information either for respective analysis sections or for respective danger details predicted based on the ocean wave information.

The radar antenna may be an antenna of fixed coastal radar.

In accordance with another aspect of the present invention to accomplish the above objects, there is provided a method for extracting ocean wave information, the method being performed by an apparatus for extracting ocean wave information, the method including receiving a radar image from a radar antenna, converting the received radar image into a digital format, setting analysis sections of the radar image and performing temporal accumulation on the analysis sections, converting accumulated analysis sections into a 3D spectrum in a 3D frequency domain by performing a temporal/spatial 3D Fast Fourier Transform (FFT) on the accumulated analysis sections, and extracting ocean wave information based on the 3D spectrum.

Extracting the ocean wave information may include calculating an ocean current speed, performing filtering to eliminate noise in a high-frequency band, extracting at least one of a spatial spectrum and a wavenumber spectrum at each angular frequency, and extracting ocean wave information, which includes at least one of wave direction information and wave height information, using the at least one extracted spectrum of the spatial spectrum and the wavenumber spectrum.

Calculating the ocean current speed may include setting a first cost function, calculating a first ocean current speed based on the first cost function, defining a dispersion relation equation in which harmonic components are considered using the calculated first ocean current speed, setting a second cost function using the defined dispersion relation equation, and calculating a second ocean current speed based on the second cost function.

The method may further include, when a difference between the first ocean current speed and the second ocean current speed is less than a threshold value, setting the second ocean current speed as the ocean current speed.

The method may further include, when the difference between the first ocean current speed and the second ocean current speed is equal to or greater than the threshold value, redefining the dispersion relation equation.

Extracting the ocean wave information may be configured to statistically extract the ocean wave information based on at least one of the spatial spectrum and the wavenumber spectrum, which are accumulated for a preset period of time.

Extracting the ocean wave information may be configured to extract the wave direction information using a selected angular frequency, based on a frequency of occurrence of angular frequencies corresponding to the spatial spectrum.

Extracting the ocean wave information may be configured to calculate a wave height based on the wavenumber spectrum, and extract the wave height information using an average wave height calculated for the preset period of time.

The method may further include displaying the extracted ocean wave information either for respective analysis sections or for respective danger details predicted based on the ocean wave information.

The radar antenna may be an antenna of fixed coastal radar.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
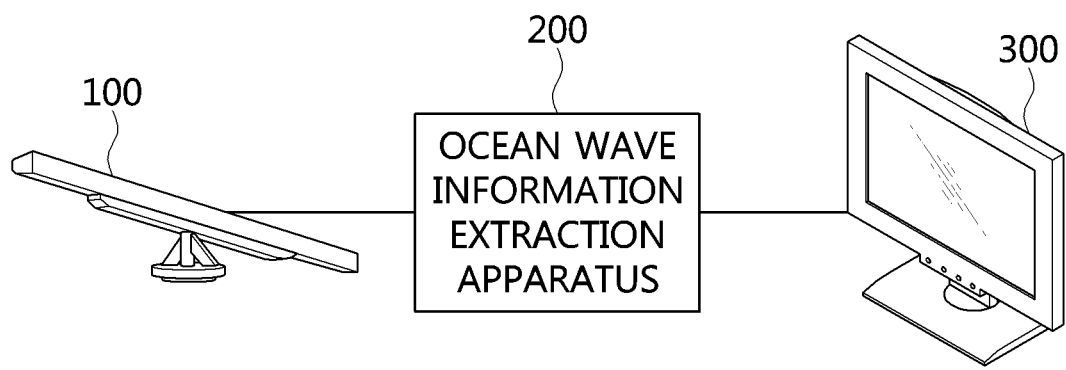
FIG. 1 is a diagram schematically showing an environment to which an apparatus for extracting ocean wave information according to an embodiment of the present invention is applied.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

FIG. 1 is a diagram schematically showing an environment to which an apparatus for extracting ocean wave information according to an embodiment of the present invention is applied.

As shown in FIG. 1, a radar antenna 100 transmits a radar image to an apparatus 200 for extracting ocean wave information (hereinafter also referred to as an "ocean wave information extraction apparatus 200"), and the ocean wave information extraction apparatus 200 statistically extracts ocean wave information using the received radar image. Further, the ocean wave information extraction apparatus 200 transmits the extracted ocean wave information to an ocean wave information output device 300, so that the ocean wave information is displayed.

First, the radar antenna 100 may be an X-Band radar antenna. The radar antenna 100 may observe the sea at band frequencies ranging from 9.41 to 10.5 GHz and at wavelengths ranging from 2.8 to 3.2 cm. Although the band frequencies and wavelengths of the radar antenna 100 are exemplified for the convenience of description, the ranges of the band frequencies and wavelengths of the radar antenna 100 are not limited to these examples.

Generally, as the length of the radar antenna 100 increases, the spatial resolution of the radar image observed by the radar antenna 100 becomes higher. Further, as the rotational speed of the radar antenna 100 increases, the resolution on a time axis may become higher. Therefore, the length and the rotational speed of the radar antenna 100 may be implemented by modifying the design thereof as needed.

In addition, the radar antenna 100 may be an antenna of fixed radar installed on coastlines (i.e. fixed coastal radar), and the ocean wave information extraction apparatus 200 may more precisely extract ocean wave information than in the case where a radar antenna installed on a moving vessel is utilized, by receiving a radar image from the radar antenna 100, which is the antenna of the fixed radar.

According to conventional technology, navigation radar has been mainly used, and thus ocean wave information has been extracted in consideration of various influences such as tidal current, ocean current, and ground logs. When a radar antenna installed on a vessel is used, as in the conventional technology, a problem may arise in that a diverging wave occurs due to the movement of the vessel or an incident wave is reflected by the vessel. Further, due to these problems, it is difficult to actually extract precise and highly reliable ocean wave information.

Therefore, the ocean wave information extraction apparatus 200 according to the embodiment of the present invention may precisely extract ocean wave information by receiving the radar image from the radar antenna 100 fixedly installed on coastlines and processing the radar image.

Further, the ocean wave information extraction apparatus 200 sets analysis sections of the radar image received from the radar antenna 100 and performs temporal accumulation on the analysis sections. Furthermore, the ocean wave information extraction apparatus 200 converts the set analysis sections into a three-dimensional (3D) spectrum by performing 3D Fast Fourier Transform (FFT) on the set analysis sections, and extracts ocean wave information based on the 3D spectrum.

Here, the ocean wave information may include at least one of a wave direction and a wave height. For the ocean wave information, the speed of an ocean current may be calculated and may be filtered, and thus the ocean wave information may be extracted based on the calculated ocean current speed.

Also, the ocean wave information extraction apparatus 200 may more precisely and stably extract ocean wave information by analyzing statistical characteristics accumulated for a predetermined period of time and extracting the ocean wave information. The extracted ocean wave information may be transmitted to the ocean wave information output device 300.

For the convenience of description, although the ocean wave information extraction apparatus 200 has been described as transmitting the extracted ocean wave information to the ocean wave information output device 300, the present invention is not limited to this example. The ocean wave information extraction apparatus 200 may transmit the ocean wave information to an external system, such as a VTS system, a danger determination/decision-making support system, or an operation system.

Finally, the ocean wave information output device 300 receives the extracted ocean wave information from the ocean wave information extraction apparatus 200 and displays the received ocean wave information. Here, the ocean wave information output device 300 may support marine control so that ocean wave information of a given area is displayed for respective layers on a basic control screen, thus allowing a controller to determine marine status in an integrated manner.

Hereinafter, the configuration of the ocean wave information extraction apparatus according to an embodiment of the present invention will be described in detail with reference to FIG. 2.

Figure 2:
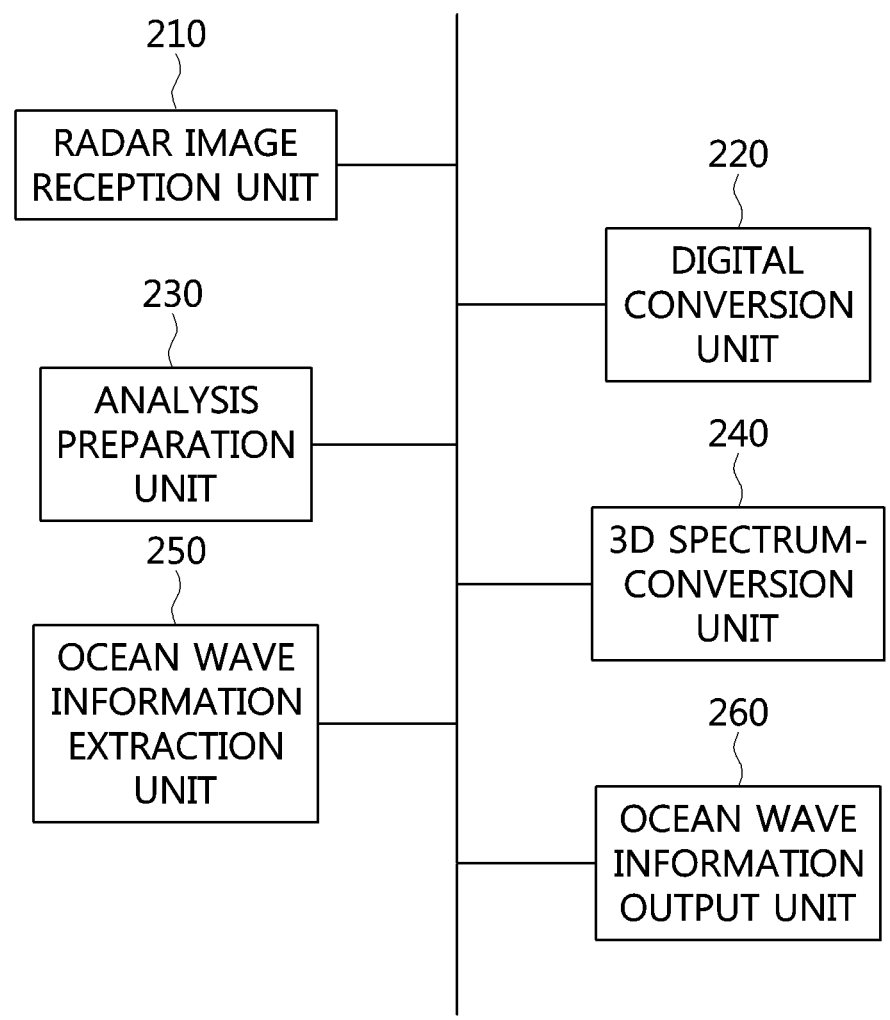
FIG. 2 is a block diagram showing the configuration of an apparatus for extracting ocean wave information according to an embodiment of the present invention.

FIG. 2 is a block diagram showing the configuration of the ocean wave information extraction apparatus according to an embodiment of the present invention.

As shown in FIG. 2, the ocean wave information extraction apparatus 200 includes a radar image reception unit 210, a digital conversion unit 220, an analysis preparation unit 230, a 3D spectrum-conversion unit 240, an ocean wave information extraction unit 250, and an ocean wave information output unit 260.

First, the radar image reception unit 210 receives a radar image from a radar antenna. Here, the radar image reception unit 210 may receive the radar image from a radar antenna fixedly installed on coastlines.

Generally, on the radar image, there is a tendency for sea clutter noise, greater than white noise in a background, to appear at a distance 5 km away from the radar antenna. Due thereto, there is a need to observe ocean waves in consideration of the effect of the distance from radar.

The digital conversion unit 220 converts the received radar image into a digital format so as to extract ocean wave information from the radar image. In this regard, the digital conversion unit 220 may convert the radar image into 8-bit grayscale values.

The digital conversion unit 220 may be implemented in the form of an Analog-to-Digital Converter (ADC). The higher the spatial resolution that may be measured using the Analog-to-Digital conversion (ADC) rate of the ADC, the higher the precision of the ocean wave information.

As the ADC rate is higher, the radar image may be converted into higher-resolution image information. However, a problem may arise in that, when the ADC rate is much greater than the Nyquist sampling rate, the amount of information that is processed is increased due to pieces of redundant information. Therefore, the ADC rate of the digital conversion unit 220 may be set differently depending on the environment to which the ocean wave information extraction apparatus 200 is applied.

Next, the analysis preparation unit 230 sets the analysis sections of the radar image converted into the digital format and performs temporal accumulation on the analysis sections.

When ocean wave information is extracted from the radar image converted by the digital conversion unit 220, as in the case of the conventional technology, the wave direction and wave height values may be instantaneously distorted. In order to solve this problem, the ocean wave information extraction apparatus 200 according to the embodiment of the present invention extracts ocean wave information by analyzing statistical characteristics accumulated for a predetermined period of time. Further, in order to analyze the statistical characteristics accumulated for the predetermined period of time, the analysis preparation unit 230 sets the analysis sections of the radar image and performs temporal accumulation on the analysis sections.

Since the ocean wave information extraction apparatus 200 cannot simultaneously analyze the entire area, which is a high-resolution image area, the analysis preparation unit 230 temporally accumulates certain analysis sections. For example, the analysis preparation unit 230 may perform temporal and spatial analysis by accumulating an image having a resolution of 128×128 in the form of 32 frames or 64 frames.

The 3D spectrum-conversion unit 240 converts the accumulated analysis sections into a 3D spectrum in a 3D frequency domain by performing a temporal/spatial 3D FFT on the accumulated analysis sections.

The ocean wave information extraction unit 250 extracts ocean wave information based on the converted 3D spectrum. Here, the ocean wave information extraction unit 250 may eliminate noise contained in the 3D spectrum, calculate the speed of ocean current, perform filtering to eliminate noise in a high-frequency band, and extract ocean wave information using at least one of a spatial spectrum and a wavenumber (or wave number) spectrum at each angular frequency.

When the ocean current speed is calculated, the ocean wave information extraction unit 250 sets a first cost function and calculates a first ocean current speed based on the first cost function. Further, the ocean wave information extraction unit 250 defines a dispersion relation equation in which harmonic components are considered using the first ocean current speed, and may set a second cost function using the defined dispersion relation equation.

Furthermore, the ocean wave information extraction unit 250 may calculate a second ocean current speed based on the second cost function, compare the difference between the first ocean current speed and the second ocean current speed with a threshold value, and then finally set the ocean current speed. At this time, when the absolute value of the difference between the first ocean current speed and the second ocean current speed is less than the threshold value, the ocean wave information extraction unit 250 may set the second ocean current speed as the ocean current speed.

On the other hand, when the absolute value of the difference between the first ocean current speed and the second ocean current speed is equal to or greater than the threshold value, the ocean wave information extraction unit 250 redefines the dispersion relation equation, and may reset the second cost function using the redefined dispersion relation equation.

Further, the ocean wave information extraction unit 250 may statistically extract ocean wave information using at least one of the spatial spectrum and the wavenumber spectrum accumulated for a preset period of time.

In particular, the ocean wave information extraction unit 250 may extract wave direction information based on the frequency of occurrence of angular frequencies corresponding to the spatial spectrum. Further, the ocean wave information extraction unit 250 may calculate a wave height based on the wavenumber spectrum, and may extract wave height information using an average wave height calculated for a preset period of time.

According to the conventional technology, a 3D FFT is performed on a radar image of a sea surface, which contains no noise, and the results of the 3D FFT are integrated with respect to an angular frequency interval in consideration of frequency ambiguity, thus enabling the radar image to correspond to a 2D plane.

In such conventional technology, a phenomenon in which a fundamental frequency and harmonic frequencies overlap each other occurs at $f(\theta,\text{spectrum})$, so that there are many cases where distortion occurs in an environment in which noise is present, and different values other than an actual maximum value are extracted, thus decreasing precision upon extracting ocean wave information.

Therefore, the ocean wave information extraction unit 250 according to the embodiment of the present invention may calculate the ocean current speed, perform filtering, extract at least one of a spatial spectrum and a wavenumber spectrum at each angular frequency, and statistically extract ocean wave information using the at least one extracted spectrum of the spatial spectrum and the wavenumber spectrum, thus enabling precise ocean wave information to be extracted.

Finally, the ocean wave information output unit 260 may display the extracted ocean wave information for respective analysis sections or may display respective danger details predicted based on the extracted ocean wave information.

For the convenience of description, the ocean wave information output unit 260 has been described as displaying the ocean wave information, but the present invention is not limited to this example. The ocean wave information extraction apparatus 200 may also be implemented to transmit the ocean wave information to an external output device, thus allowing the external output device to display the ocean wave information.

Further, the ocean wave information extraction apparatus 200 may transmit the ocean wave information to an external system and may support the external system so that the external system controls marine traffic or makes a decision upon determining the presence of a dangerous situation, based on the ocean wave information.

Hereinafter, a method for extracting ocean wave information, performed by the ocean wave information extraction apparatus, according to an embodiment of the present invention will be described in detail with reference to FIGS. 3 to 5.

Figure 3:
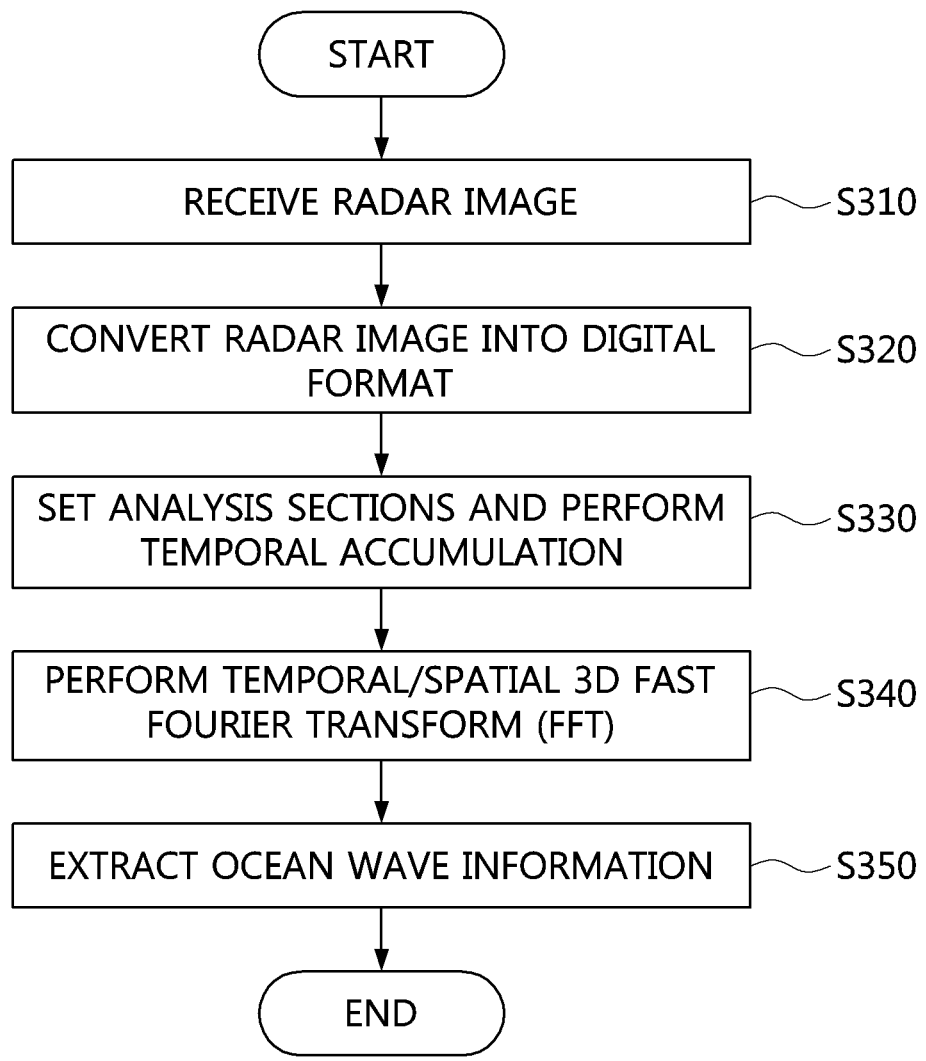
FIG. 3 is a flowchart for explaining a method for extracting ocean wave information according to an embodiment of the present invention.

FIG. 3 is a flowchart for explaining a method for extracting ocean wave information according to an embodiment of the present invention.

First, the ocean wave information extraction apparatus 200 receives a radar image from the radar antenna at step S310.

The ocean wave information extraction apparatus 200 may periodically receive a high-resolution radar image sequence corresponding to an observation target area from an X-band radar antenna. Here, the X-band radar antenna may be a radar antenna fixedly installed on coastlines, and the ocean wave information extraction apparatus 200 may display the received radar image and provide the radar image to a user or may store the radar image.

Further, the ocean wave information extraction apparatus 200 converts the received radar image into a digital format at step S320.

In detail, the ocean wave information extraction apparatus 200 converts an analog-format radar image into a digital format so as to extract ocean wave information from the radar image. Here, the ocean wave information extraction apparatus 200 may convert the radar image into an 8-bit grayscale image format.

Then, the ocean wave information extraction apparatus 200 sets analysis sections and performs temporal accumulation on the analysis sections at step S330.

The ocean wave information extraction apparatus 200 sets the analysis sections required to analyze ocean waves and performs temporal accumulation required to analyze statistical characteristics. The ocean wave information extraction apparatus 200 accumulates the analysis sections for a predetermined period of time in order to solve the problem of extracting instantaneously distorted ocean wave information. Further, the ocean wave information extraction apparatus 200 analyzes statistical characteristics, accumulated for the predetermined period of time, and extracts the ocean wave information at step S350, which will be described later, thus enabling ocean wave information to be stably and precisely extracted.

After temporal accumulation has been performed, the ocean wave information extraction apparatus 200 performs a temporal/spatial 3D Fast Fourier Transform (FFT) at step S340.

In detail, as given by the following Equation (1), the ocean wave information extraction apparatus 200 performs a 3D FFT for converting the accumulated analysis sections into a 3D frequency domain by performing a 3D integral on the accumulated analysis sections with respect to spatial coordinates x and y and a temporal coordinate t.

$$F(k_x,k_y,\omega)=\iiint \zeta(x,y,t)e^{-i(k_xx+k_yy+\omega t)}dxdydt \quad (1)$$

where $\zeta(x,y,t)$ denotes consecutive radar images, $k_x$ and $k_y$ denote a wavenumber, and $\omega$ denotes an angular frequency.

The 3D spectrum calculated by Equation (1) contains various types of noise as well as components related to ocean wave information. Therefore, the ocean wave information extraction apparatus 200 may eliminate noise based on a dispersion relation using the following Equation (2):

$$\omega_0=\sqrt{g|\vec{k}|\tanh(|\vec{k}|d)}+\vec{k}+\vec{U} \quad (2)$$

where $\vec{k}$ denotes a wavenumber vector composed of $k_x$ and $k_y$, g denotes the acceleration of gravity, d denotes the depth of water in an observation area, and $\vec{U}$ denotes the speed of ocean current.

Here, the ocean current speed may include the sum of speed components which occur in addition to the movement speed of a wave itself, for example, sea-level speeds attributable to wind, ocean current, and tidal current.

Finally, the ocean wave information extraction apparatus 200 extracts ocean wave information at step S350.

The ocean wave information extraction apparatus 200 calculates the ocean current speed, which is the sum of the speed components attributable to wind, ocean current, and tidal current, and performs filtering to eliminate noise.

Although the ocean wave information extraction apparatus 200 eliminates noise related to the dispersion relation using Equations (1) and (2), at step S340, various types of noise may be contained in a high-frequency band. Therefore, in order to eliminate noise from the high-frequency band, the ocean wave information extraction apparatus 200 may perform filtering.

Further, after filtering has been performed, the ocean wave information extraction apparatus 200 may extract at least one of a spatial spectrum and a wavenumber spectrum at the angular frequency and may extract ocean wave information using the at least one extracted spectrum of the spatial spectrum and the wavenumber spectrum.

A procedure in which the ocean wave information extraction apparatus 200 extracts the ocean wave information will be described in detail below with reference to FIG. 4.

Figure 4:
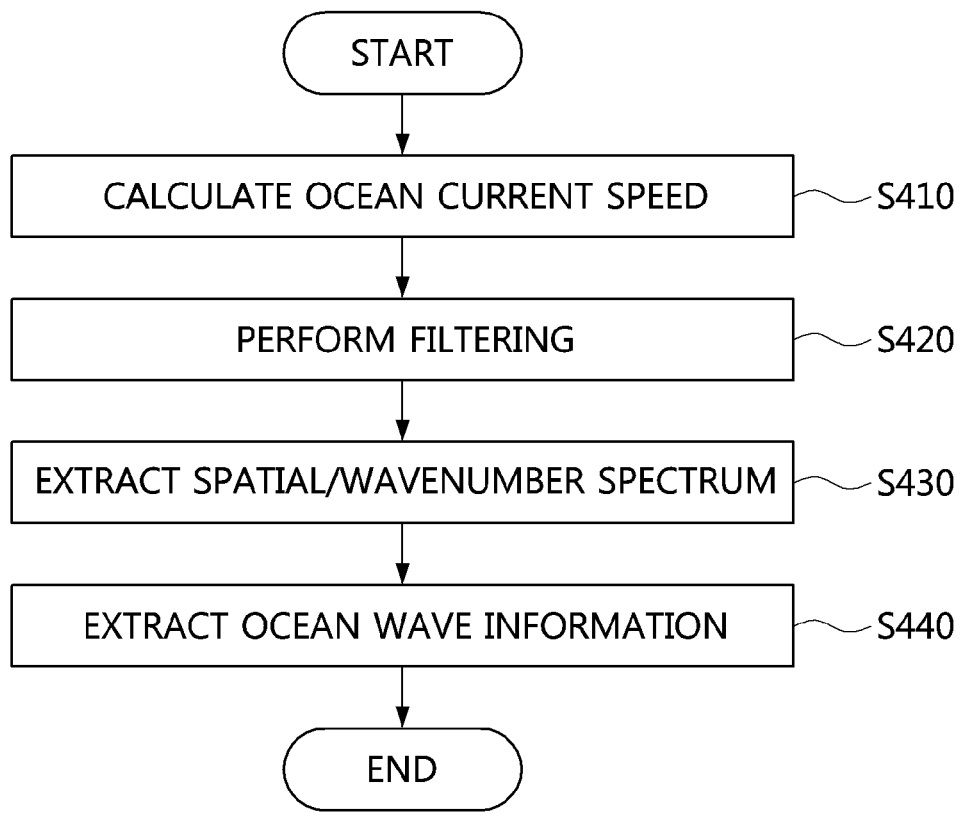
FIG. 4 is a flowchart for explaining a procedure for extracting ocean wave information at step S350 of FIG. 3.

FIG. 4 is a flowchart for explaining a procedure for extracting ocean wave information at step S350 of FIG. 3.

The ocean wave information extraction apparatus 200 calculates an ocean current speed at step S410.

Here, the ocean wave information extraction apparatus 200 may compare the difference between a first ocean current speed, calculated based on a first cost function, and a second ocean current speed, calculated based on a second cost function, with a threshold value, and may then finally calculate an ocean current speed.

The procedure in which the ocean wave information extraction apparatus 200 calculates the ocean current speed will be described in detail later with reference to FIG. 5.

Then, the ocean wave information extraction apparatus 200 performs filtering at step S420.

Even if the ocean wave information extraction apparatus 200 eliminates noise related to the dispersion relation using Equations (1) and (2) at step S340 of FIG. 3, noise in a high-frequency band may remain without being eliminated. Therefore, the ocean wave information extraction apparatus 200 may perform filtering to eliminate noise from the high frequency domain based on the following Equation (3):

$$E(k_x,k_y,\omega)=(\sqrt{k_x^2+k_y^2})^{-1.1}\int F(k_x,k_y,\sigma)\delta(\sigma-\omega)d\sigma \quad (3)$$

The ocean wave information extraction apparatus 200 detects a fundamental waveform based on the maximum values of $k_x$, $k_y$, and $\omega$ from a 3D temporal-spatial spectrum, as shown in Equation (3). Also, the ocean wave information extraction apparatus 200 may extract a wavenumber (spatial frequency) component and an angular frequency (temporal frequency) component using the values of $k_x$, $k_y$, and $\omega$.

Further, the ocean wave information extraction apparatus 200 extracts at least one of a spatial spectrum and a wavenumber spectrum at each angular frequency at step S430.

When a fundamental waveform is detected using Equation (3) at step S420, an inaccurate or unstable value may be detected. In order to solve this problem, the ocean wave information extraction apparatus 200 according to the embodiment of the present invention may extract a spatial spectrum at the corresponding angular frequency using the following Equation (4):

$$S(k_x,k_y,\omega)=\int_{\omega-\beta/2}^{\omega+\beta/2}E(k_x,k_y,\omega)d\omega \quad (4)$$

where $\beta$ denotes the size of a predetermined area on which an integral is performed.

The ocean wave information extraction apparatus 200 may extract a spatial spectrum at the corresponding angular frequency by integrating the result of the filtering with respect to the angular frequency of Equation (2) by the size $\beta$ of the predetermined area using Equation (4).

When the ocean wave information extraction apparatus 200 configures 64 temporal frames at step S340 of FIG. 3 and converts the 64 temporal frames into a 3D spectrum, angular frequencies in the 3D spectrum are 64 frequencies and the 3D spectrum has a symmetrical structure of (−32, 1) and (0, 31). Here, the ocean wave information extraction apparatus 200 may perform band-pass filtering so as to take only a positive frequency component and minimize the influence of a shadow effect or high-frequency noise.

The ocean wave information extraction apparatus 200 may exclude a low-frequency band corresponding to frames (0, 3) so as to minimize the influence of noise attributable to the shadow effect and may exclude a high-frequency band corresponding to frames (29, 31) so as to minimize the influence of high-frequency noise. Here, the ocean wave information extraction apparatus 200 may set frequency bands such as (0, 3) and (29, 31) based on experimental data, but the frequency band of the band-pass filter is not limited to this example.

Further, the ocean wave information extraction apparatus 200 obtains a wavenumber at which the value of $|S(k_x,k_y,\omega)|$ is maximized at each angular frequency from a frequency band of (4, 28), which is the result of band pass filtering, and the value of $|S(k_x,k_y,\omega)|$ at the corresponding wavenumber.

Furthermore, the ocean wave information extraction apparatus 200 selects a number of larger values identical to the preset number of values from among the values of $|S(k_x,k_y,\omega)|$ obtained at respective angular frequencies, and stores angular frequencies ω corresponding to the selected values of $|S(k_x,k_y,\omega)|$.

Here, when the ocean wave information extraction apparatus 200 outputs the values of stored angular frequencies ω every time a 3D FFT is performed, unstable values may be output due to noise in the radar images, harmonic components, etc.

Therefore, in order to solve this problem, the ocean wave information extraction apparatus 200 according to the embodiment of the present invention may extract angular frequencies ω using results accumulated for a preset time unit, and may extract wave direction information using wavenumbers corresponding to the extracted angular frequencies ω. Here, the ocean wave information extraction apparatus 200 may extract an angular frequency ω having the highest frequency of occurrence (i.e. the angular frequency that occurs most frequently) from the angular frequencies ω for the preset time unit.

Further, the ocean wave information extraction apparatus 200 extracts ocean wave information at step S440.

The ocean wave information extraction apparatus 200 may extract wave direction information by applying the wavenumber corresponding to the extracted angular frequency ω to the following Equation (5).

$$\theta = \tan^{-1}\left(\frac{k_y}{k_x}\right) \quad (5)$$

where θ denotes wave direction information.

In addition, the ocean wave information extraction apparatus 200 extracts wave height information. Here, the wave height information may mean a significant wave height. The term "significant wave height" denotes the average of wave heights of selected waves when n waves which successively pass through any one point are observed and n/3 waves are selected from a portion having the maximum wave height.

The ocean wave information extraction apparatus 200 extracts a wavenumber spectrum using the following Equations (6) and (7):

$$G(k_x, k_y) = 2\int_{\omega>0} E(k_x, k_y, \omega)d\omega \quad (6)$$

$$G(\theta, \omega) = \frac{\partial(k_x, k_y)}{\partial(\theta, \omega)} G(k_x, k_y) \quad (7)$$

Further, the ocean wave information extraction apparatus 200 may extract wave height information by applying the extracted wavenumber spectrum to the following Equation (8):

$$h_s = 4\sqrt{\iint G(\omega,\theta)d\omega d\theta} \quad (8)$$

The wave height information extracted in a short-term section using Equation (8) may be unstable and variable due to various types of noise. Therefore, the ocean wave information extraction apparatus 200 calculates the average value of wave heights extracted for the preset time unit, and extracts the finally calculated average value of wave heights as the wave height information.

Below, a procedure for calculating the speed of ocean current will be described in greater detail with reference to FIG. 5.

As the speed of ocean current at an actual sea surface is more precisely calculated, the ocean wave information extraction apparatus 200 may extract precise wave direction information and precise wave height information. In the conventional technology, a method for calculating the ocean current speed by minimizing a least square error has been mainly used. However, such a conventional method is based on an algorithm for searching only for a location having the maximum energy, and is known to have very low performance.

Therefore, the ocean wave information extraction apparatus 200 according to the embodiment of the present invention calculates an ocean current speed using a method for applying an adaptive termination criterion based on a scheme for minimizing a repetitive least square error and a method for minimizing a least square error from results obtained by assigning the results of a 3D FFT as weights.

Figure 5:
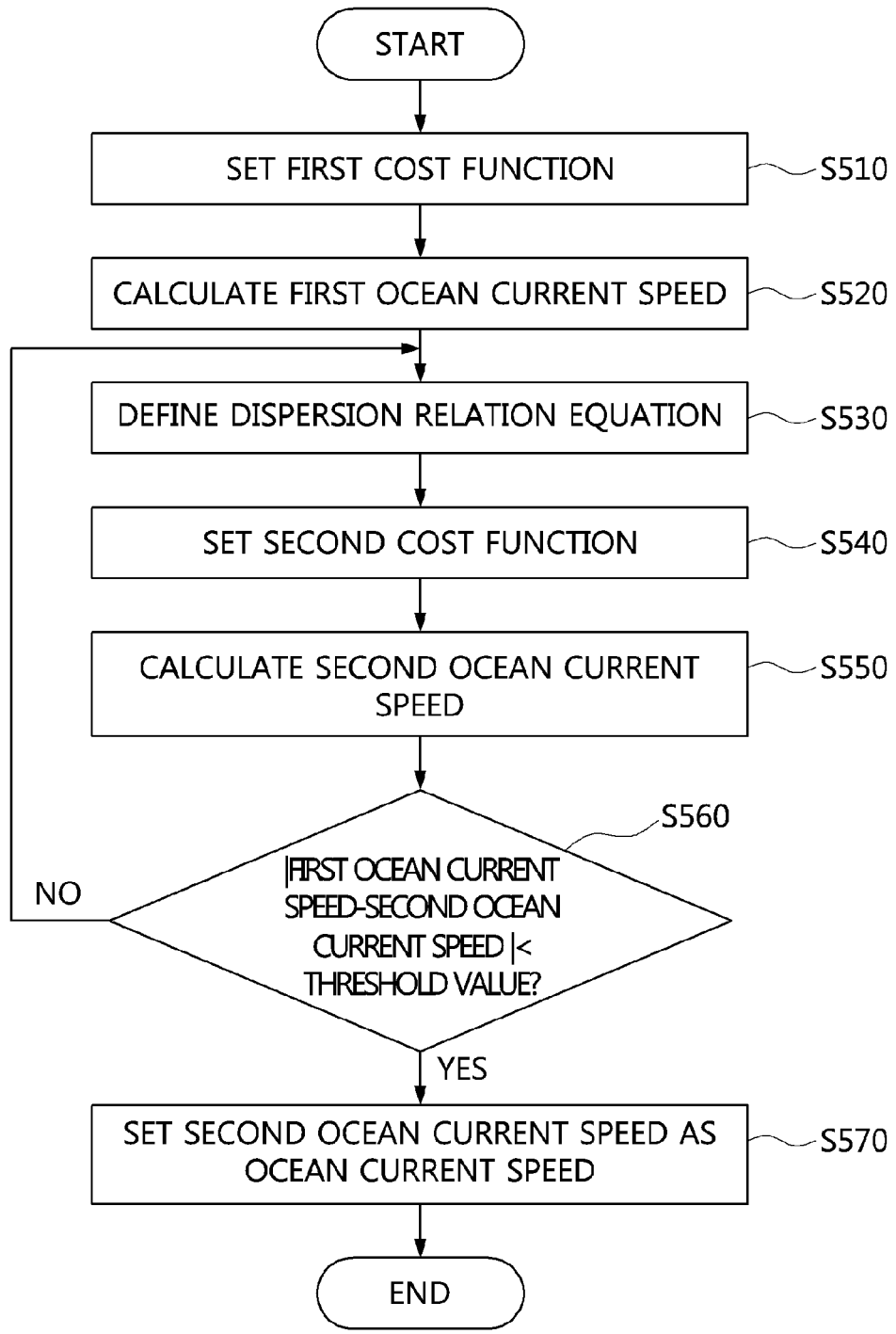
FIG. 5 is a flowchart for explaining a procedure for calculating an ocean current speed at step S410 of FIG. 4.

FIG. 5 is a flowchart for explaining a procedure for calculating an ocean current speed at step S410 of FIG. 4.

First, the ocean wave information extraction apparatus 200 sets a first cost function at step S510.

The ocean wave information extraction apparatus 200 sets the first cost function using the results of Equation (3), that is, $E(k_x,k_y,\omega)$. Here, the first cost function may be set, as given by the following Equation (9):

$$J = \Sigma\Sigma\Sigma(\Delta\omega)^2 E(k_x,k_y,\omega) \quad (9)$$

where $\Delta\omega$ is $\omega - \omega_0 - k_x U_x - k_y U_y$.

Further, the ocean wave information extraction apparatus 200 calculates a first ocean current speed at step S520.

The ocean wave information extraction apparatus 200 may calculate the first ocean current speed, as given by the following Equation (10) by differentiating J in Equation (9) with respect to respective frequency components in order to minimize the value of J.

$$\begin{pmatrix} U_x \\ U_y \end{pmatrix} = \frac{1}{(\Sigma Ek_x^2)(\Sigma Ek_y^2)} \begin{pmatrix} \Sigma Ek_y^2 & \Sigma Ek_x k_y \\ \Sigma Ek_x k_y & \Sigma Ek_x^2 \end{pmatrix} \begin{pmatrix} \Sigma E(\omega-\omega_0)k_x \\ \Sigma E(\omega-\omega_0)k_y \end{pmatrix} \quad (10)$$

In this case, the first ocean current speed, calculated by the ocean wave information extraction apparatus 200 using Equation (10), is represented by $U_{x_{n-1}}$ and $U_{y_{n-1}}$.

Next, the ocean wave information extraction apparatus 200 defines a dispersion relation equation at step S530.

The ocean wave information extraction apparatus 200 defines an equation including the dispersion relation such as p=0, 1, 2, . . . , as given by the following Equation (11):

$$\omega_p = \pm(p+1)\sqrt{\frac{g|\vec{k}|}{(p+1)}} + k_x U_x + k_y U_y \quad (11)$$

Then, the ocean wave information extraction apparatus 200 sets a second cost function at step S540.

The ocean wave information extraction apparatus 200 sets a second cost function, which is a new cost function, using the following Equation (12) based on the dispersion relation equation in Equation (11).

$$J = \Sigma\Sigma\Sigma(\omega - G_p(k_{x_i},k_{y_i}) - k_{x_i}U - k_{y_i}U)^2 E(k_{x_i},k_{y_i},\omega) \quad (12)$$

Here, $k_{x_i}$ and $k_{y_i}$ denote a wavenumber in an i-th repetition interval, $E(k_{x_i}, k_{y_i}, \omega)$ denotes a spatial spectrum, and $G_p(k_{x_i}, k_{y_i})$ denotes the results of Equation (3) corresponding to the wavenumber in the i-th repetition interval at the angular frequency determined based on the dispersion relation equation.

Next, the ocean wave information extraction apparatus 200 calculates a second ocean current speed at step S550.

In order to minimize the second cost function newly defined by Equation (12), the ocean wave information extraction apparatus 200 calculates the second ocean current speed. For the convenience of description, the second ocean current speed calculated by the ocean wave information extraction apparatus 200 at step S550 is represented by $U_{x_n}$ and $U_{y_n}$.

Further, the ocean wave information extraction apparatus 200 compares the absolute value of the difference between the first ocean current speed and the second ocean current speed with a threshold value at step S560.

In detail, the ocean wave information extraction apparatus 200 calculates the absolute value of the difference between the first ocean current speed ($U_{x_{n-1}}$ and $U_{y_{n-1}}$), calculated at step S20, and the second ocean current speed ($U_{x_n}$ and $U_{y_n}$), calculated at step S550. Further, the ocean wave information extraction apparatus 200 determines whether the calculated absolute value is less than the threshold value by comparing the absolute value with the threshold value.

For example, when the threshold value is 0.005, the ocean wave information extraction apparatus 200 determines whether $|U_{x_n} - U_{x_{n-1}}| < 0.005$ and $|U_{y_n} - U_{y_{n-1}}| < 0.005$ are satisfied.

As a result of the comparison, if it is determined that the absolute value of the difference between the first ocean current speed and the second ocean current speed is less than the threshold value, the ocean wave information extraction apparatus 200 sets the second ocean current speed as the final ocean current speed at step S570.

On the other hand, if it is determined that the absolute value of the difference between the first ocean current speed and the second ocean current speed is equal to or greater than the threshold value, the ocean wave information extraction apparatus 200 redefines the dispersion relation equation by performing step S530. Further, steps S540 to S570 are performed based on the redefined dispersion relation equation.

Hereinafter, a VTS system to which the ocean wave information extraction apparatus is applied according to an embodiment of the present invention will be described in detail with reference to FIG. 6.

Figure 6:
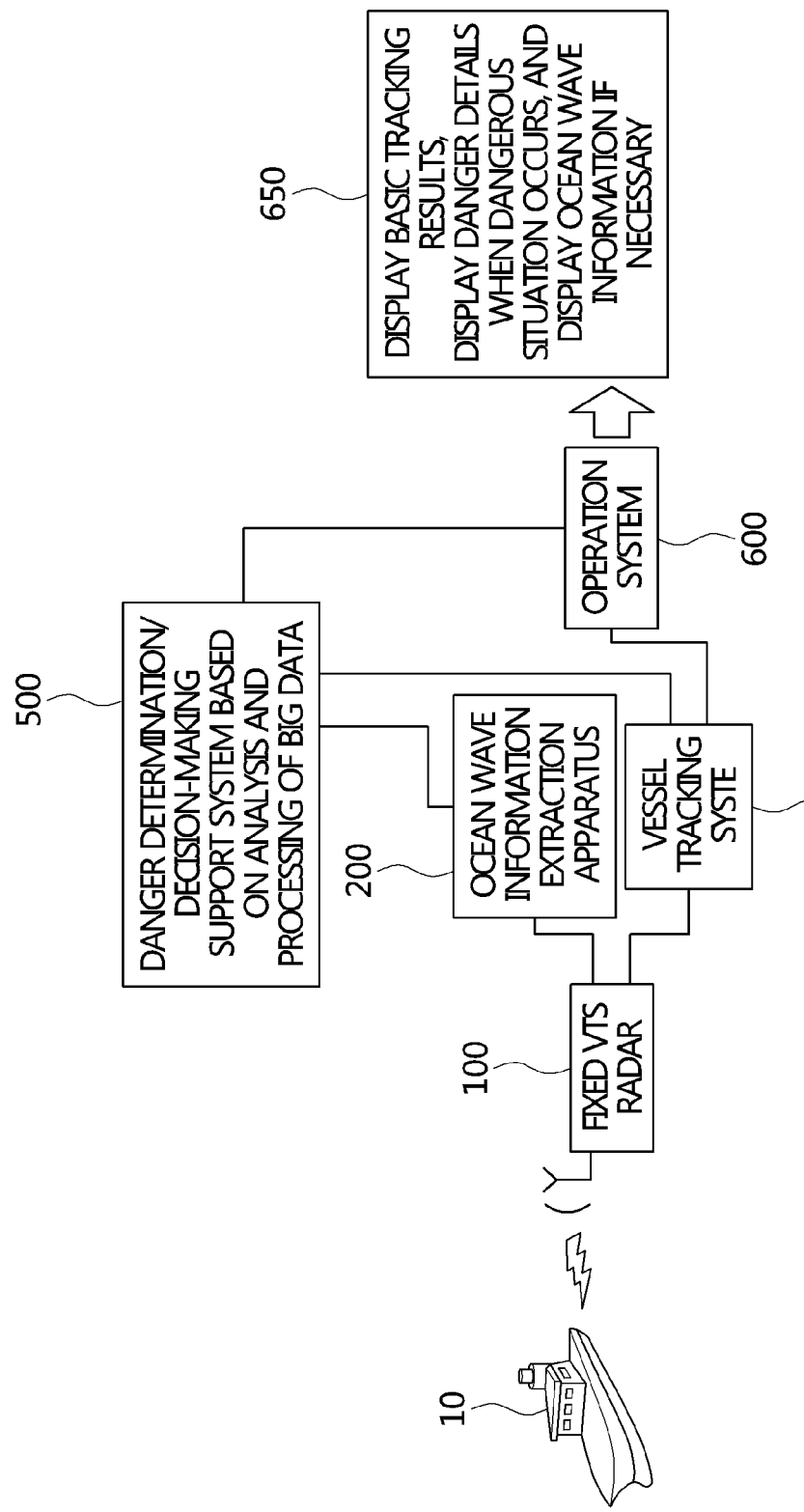
FIG. 6 is a diagram illustrating a VTS system to which the apparatus for extracting ocean wave information is applied according to an embodiment of the present invention.

FIG. 6 is a diagram illustrating a VTS system to which the ocean wave information extraction apparatus is applied according to an embodiment of the present invention.

As shown in FIG. 6, a radar antenna 100 may transmit radar images, obtained by detecting one or more vessels 10, to the ocean wave information extraction apparatus 200 and to a vessel tracking system 400.

Also, the ocean wave information extraction apparatus 200 transmits extracted ocean wave information to a danger determination/decision-making support system 500 based on analysis and processing of big data, thus enabling the presence of a dangerous situation to be determined based on the extracted ocean wave information, and supporting decision-making in a dangerous situation. Here, the danger determination/decision-making support system 500 may receive vessel tracking information from the vessel tracking system 400, determine the presence of a dangerous situation, and support decision-making to respond to the dangerous situation.

An operation system 600 receives information for VTS from at least one of the ocean wave information extraction apparatus 200, the vessel tracking system 400, and the danger determination/decision-making support system 500.

Further, a VTS output device 650 receives the information for VTS from the operation system 600 and displays the information. Here, the VTS output device 650 may display basic tracking results, display danger details when a dangerous situation occurs, or display ocean wave information if necessary. The VTS output device 650 may display ocean wave information of a given area for respective layers on a basic control screen, thus enabling marine traffic situations to be determined in an integrated manner.

In this way, the ocean wave information extraction apparatus 200 according to the embodiment of the present invention may receive radar images from fixed radar installed on coastlines, thus fundamentally solving problems that may occur in the case where radar images are received from radar installed on a moving vessel and are then used.

Further, the ocean wave information extraction apparatus 200 may simplify problems, calculate a corrected ocean current speed, perform noise elimination, statistically accumulate ocean wave information, and finally extract ocean wave information, thus enabling ocean wave information to be stably and precisely extracted. Furthermore, the ocean wave information extraction apparatus 200 may more accurately extract an ocean current speed compared to conventional ocean current speed prediction algorithms, with the result that more precise ocean wave information may be extracted.

Figure 7:
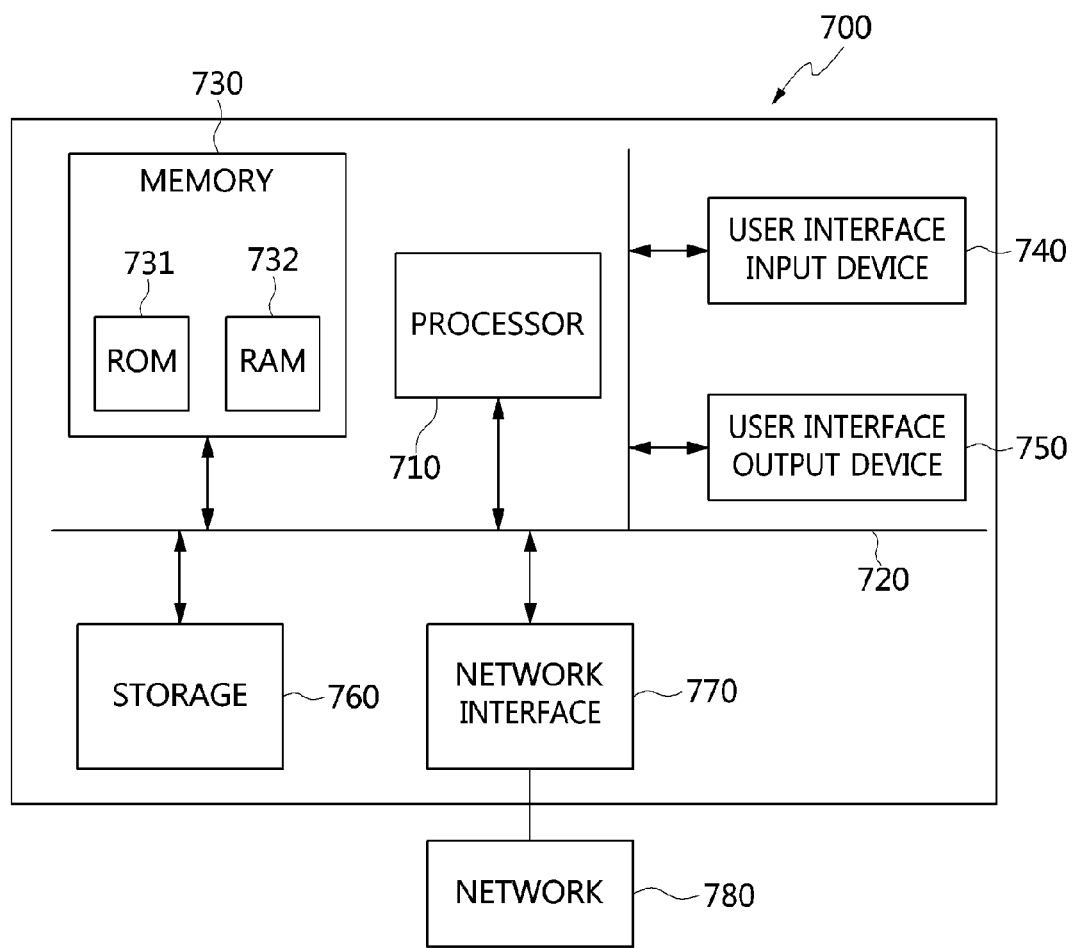
FIG. 7 is a block diagram showing a computer system according to an embodiment of the present invention.

FIG. 7 is a block diagram showing a computer system according to an embodiment of the present invention.

The embodiment of the present invention may be implemented in a computer system 700 such as a computer-readable storage medium. As shown in FIG. 7, the computer system 700 may includes one or more processors 710, memory 730, a user interface input device 740, a user interface output device 750, and storage 760, which communicate with each other through a bus 720. The computer system 700 may further include a network interface 770 connected to a network 780. Each of the processors 710 may be either a Central Processing Unit (CPU) or a semiconductor device for executing processing instructions stored in the memory 730 or the storage 760. Each of the memory 730 and the storage 760 may be any of various types of volatile or nonvolatile storage media. For example, the memory may include Read Only Memory (ROM) 731 or Random Access Memory (RAM) 732.

Therefore, the embodiment of the present invention may be implemented as a non-temporary computer-readable medium in which a computer-implemented method is recorded or in which computer-executable instructions are recorded. When the computer-executable instructions are executed by the processor, the instructions may perform the method according to at least one aspect of the present invention.

In accordance with the present invention, ocean wave information may be extracted using a simpler method than when using marine radar, by using fixed coastal radar.

Further, in accordance with the present invention, ocean wave information may be more precisely extracted by statistically accumulating and extracting ocean wave information.

Furthermore, in accordance with the present invention, decision-making may be supported upon controlling marine traffic by extracting ocean wave information in real time and transmitting the extracted information to a VTS system.

As described above, in the ocean wave information extraction apparatus and method according to the present invention, the configurations and schemes in the above-described embodiments are not limitedly applied, and some or all of the above embodiments can be selectively combined and configured so that various modifications are possible.

What is claimed is:

1. An apparatus for extracting ocean wave information, comprising:
   a radar image reception unit for receiving, using an interface, a radar image from a radar antenna of a fixed coastal radar;
   a digital conversion unit for converting, using a processor, the received radar image into a digital format;
   an analysis preparation unit for setting analysis sections of the radar image converted into the digital format and performing temporal accumulation on the analysis sections, using a processor;
   a three-dimensional (3D) spectrum-conversion unit for converting, using a processor, accumulated analysis sections into a 3D spectrum in a 3D frequency domain by performing a temporal/spatial 3D Fast Fourier Transform (FFT) on the accumulated analysis sections; and
   an ocean wave information extraction unit for extracting, using a processor, ocean wave information based on the 3D spectrum,
   wherein the ocean wave information extraction unit calculates an ocean current speed, performs filtering to eliminate noise in a high-frequency band of the ocean current speed, and extracts the ocean wave information, which includes at least one of wave direction information and wave height information, using at least one of a spatial spectrum and a wavenumber spectrum at each angular frequency, and
   wherein the ocean wave information extraction unit sets a first cost function, calculates a first ocean current speed based on the first cost function, defines a dispersion relation equation in which harmonic components are considered using the calculated first ocean current speed, sets a second cost function using the defined dispersion relation equation, and calculates a second ocean current speed based on the second cost function.

2. The apparatus of claim 1, wherein the ocean wave information extraction unit is configured to, when a difference between the first ocean current speed and the second ocean current speed is less than a threshold value, set the second ocean current speed as the ocean current speed.

3. The apparatus of claim 2, wherein the ocean wave information extraction unit is configured to, when the difference between the first ocean current speed and the second ocean current speed is equal to or greater than the threshold value, redefine the dispersion relation equation.

4. The apparatus of claim 1, wherein the ocean wave information extraction unit statistically extracts the ocean wave information based on at least one of the spatial spectrum and the wavenumber spectrum, which are accumulated for a preset period of time.

5. The apparatus of claim 4, wherein the ocean wave information extraction unit extracts the wave direction information based on a frequency of occurrence of angular frequencies corresponding to the spatial spectrum.

6. The apparatus of claim 4, wherein the ocean wave information extraction unit calculates a wave height based on the wavenumber spectrum, and extracts the wave height information using an average wave height calculated for the preset period of time.

7. The apparatus of claim 1, further comprising an ocean wave information output unit for displaying the extracted ocean wave information either for respective analysis sections or for respective danger details predicted based on the ocean wave information.

8. A method for extracting ocean wave information, the method being performed by an apparatus for extracting the ocean wave information, the method comprising:
   receiving a radar image from a radar antenna of a fixed coastal radar;
   converting the received radar image into a digital format;
   setting analysis sections of the radar image converted into the digital format and performing temporal accumulation on the analysis sections;
   converting accumulated analysis sections into a 3D spectrum in a 3D frequency domain by performing a temporal/spatial 3D Fast Fourier Transform (FFT) on the accumulated analysis sections; and
   extracting the ocean wave information based on the 3D spectrum,
   wherein extracting the ocean wave information comprises:
      calculating an ocean current speed;
      performing filtering to eliminate noise in a high-frequency band of the ocean current speed;
      extracting at least one of a spatial spectrum and a wavenumber spectrum at each angular frequency; and
      extracting the ocean wave information, which includes at least one of wave direction information and wave height information, using the at least one extracted spectrum of the spatial spectrum and the wavenumber spectrum, and
   wherein calculating the ocean current speed comprises:
      setting a first cost function;
      calculating a first ocean current speed based on the first cost function;
      defining a dispersion relation equation in which harmonic components are considered using the calculated first ocean current speed;
      setting a second cost function using the defined dispersion relation equation; and
      calculating a second ocean current speed based on the second cost function.

9. The method of claim 8, further comprising, when a difference between the first ocean current speed and the second ocean current speed is less than a threshold value, setting the second ocean current speed as the ocean current speed.

10. The method of claim 9, further comprising, when the difference between the first ocean current speed and the second ocean current speed is equal to or greater than the threshold value, redefining the dispersion relation equation.

11. The method of claim 8, wherein extracting the ocean wave information is configured to statistically extract the ocean wave information based on at least one of the spatial spectrum and the wavenumber spectrum, which are accumulated for a preset period of time.

12. The method of claim 11, wherein extracting the ocean wave information is configured to extract the wave direction information using a selected angular frequency, based on a frequency of occurrence of angular frequencies corresponding to the spatial spectrum.

13. The method of claim 11, wherein extracting the ocean wave information is configured to calculate a wave height based on the wavenumber spectrum, and extract the wave height information using an average wave height calculated for the preset period of time.

14. The method of claim 8, further comprising displaying the extracted ocean wave information either for respective analysis sections or for respective danger details predicted based on the ocean wave information.

* * * * *